United States Patent
Flick et al.

(10) Patent No.: US 6,767,621 B2
(45) Date of Patent: Jul. 27, 2004

(54) GELATINOUS COMPOSITE ARTICLE AND CONSTRUCTION

(75) Inventors: Roland E. Flick, Elma, NY (US); Joel T. Jusiak, Boston, NY (US)

(73) Assignee: Gaymar Industries, Inc., OrchardPark, NY (US)

( * ) Notice: Subject to any disclaimer, the term of this patent is extended or adjusted under 35 U.S.C. 154(b) by 175 days.

(21) Appl. No.: 10/214,252

(22) Filed: Aug. 7, 2002

(65) Prior Publication Data

US 2002/0187332 A1 Dec. 12, 2002

Related U.S. Application Data

(60) Division of application No. 09/257,790, filed on Feb. 25, 1999, now Pat. No. 6,447,865, which is a continuation-in-part of application No. 09/120,640, filed on Jul. 22, 1998, now Pat. No. 6,099,951.

(51) Int. Cl.[7] .............................. B32B 3/06; B32B 3/26; B32B 5/24; A47B 7/00; A47C 17/00
(52) U.S. Cl. ............................... 428/306.6; 428/304.4; 442/370; 5/613; 5/620; 5/909
(58) Field of Search ........................ 428/304.4, 306.6; 442/370, 398, 399; 5/909, 613, 620

(56) References Cited

U.S. PATENT DOCUMENTS

| | | |
|---|---|---|
| 3,083,381 A | 4/1963 | Bailey |
| 3,266,064 A | 8/1966 | Figman |
| 3,345,654 A | 10/1967 | Noble |
| 3,444,922 A | 5/1969 | Dingman |
| 3,681,797 A | 8/1972 | Messner |
| 3,778,851 A | 12/1973 | Howorth |
| 4,057,861 A | 11/1977 | Howorth |
| 4,073,021 A | 2/1978 | Carlisle |
| 4,132,262 A | 1/1979 | Wibell |
| 4,369,284 A | 1/1983 | Chen |
| 4,454,615 A | 6/1984 | Whitney |
| 4,483,030 A | 11/1984 | Flick et al. |
| 4,618,213 A | 10/1986 | Chen |
| 4,825,868 A | 5/1989 | Susa et al. |
| 4,884,304 A | 12/1989 | Elkins |
| 4,945,588 A | 8/1990 | Cassidy et al. |
| 4,964,402 A | 10/1990 | Grim et al. |
| 4,969,459 A | 11/1990 | Gusakov |
| 5,020,523 A | 6/1991 | Bodine |

(List continued on next page.)

FOREIGN PATENT DOCUMENTS

| | | |
|---|---|---|
| EP | 0 558 713 | 3/1998 |
| GB | 2 346 809 | 8/2000 |
| JP | 6503438 | 8/1992 |

OTHER PUBLICATIONS

Gove (Editor–in Chief) et al., *Webster's Third New International Dictionary of the English Language Unabridged*, G.&C. Merriam Company, 1966, cover page and p. 1456.

*Primary Examiner*—Cheryl A. Juska
*Assistant Examiner*—Lynda Salvatore
(74) *Attorney, Agent, or Firm*—Roach, Brown, McCarthy & Gruber, P.C.; Kevin D. McCarthy, Esq.

(57) ABSTRACT

The present invention relates to a gelatinous composite article. The article has a first and a second heat formable and heat reversible gelatinous elastomer material, a first permeable layer, and a control gap. Each of the gelatinous materials is a three-dimensional shape having an upper side, a base side and at least one connecting side. The first connecting side and the second connecting side are adjacent to each other so the first and second materials are essentially side-by-side within the same horizontal plane. The first permeable layer has a top side and a bottom side. The top side attaches to the first and second connecting side. The control gap is interspaced between the bottom side of the first permeable layer. This gap degrades the rigidity between each connecting side and provides an equivalent structural property throughout the article.

12 Claims, 10 Drawing Sheets

U.S. PATENT DOCUMENTS

| | | |
|---|---|---|
| 5,027,801 A | 7/1991 | Grim |
| 5,068,935 A | 12/1991 | Hagopian |
| 5,072,468 A | 12/1991 | Hagopian |
| 5,109,165 A | 4/1992 | Gusakov |
| 5,140,309 A | 8/1992 | Gusakov |
| 5,152,021 A | 10/1992 | Vrzalik |
| 5,183,039 A | 2/1993 | Sarian et al. |
| 5,184,112 A | 2/1993 | Gusakov |
| 5,195,199 A | 3/1993 | Sereboff |
| 5,216,768 A | 6/1993 | Bodine et al. |
| 5,262,468 A | 11/1993 | Chen |
| 5,263,213 A | 11/1993 | Robertson et al. |
| 5,269,369 A | 12/1993 | Faghri |
| D343,531 S | 1/1994 | Hagopian |
| 5,277,695 A | 1/1994 | Johnson, Jr. et al. |
| 5,297,553 A | 3/1994 | Sliwa, Jr. et al. |
| 5,313,675 A | 5/1994 | Tinen |
| 5,328,445 A | 7/1994 | Spahn et al. |
| 5,329,096 A | 7/1994 | Suematsu |
| 5,334,646 A | 8/1994 | Chen |
| 5,336,708 A | 8/1994 | Chen |
| D351,071 S | 10/1994 | Hagopian |
| 5,372,576 A | 12/1994 | Hicks |
| 5,389,065 A | 2/1995 | Johnson, Jr. |
| 5,415,624 A | 5/1995 | Williams |
| 5,456,701 A | 10/1995 | Stout |
| 5,487,196 A | 1/1996 | Wilkinson et al. |
| 5,489,259 A | 2/1996 | Jacobs et al. |
| D368,525 S | 4/1996 | Karten et al. |
| 5,508,334 A | 4/1996 | Chen |
| 5,542,136 A | 8/1996 | Tappel |
| 5,561,875 A | 10/1996 | Graebe |
| 5,586,346 A | 12/1996 | Stacy et al. |
| 5,599,283 A | 2/1997 | Lindenmeyer et al. |
| 5,603,690 A | 2/1997 | Barry |
| 5,634,225 A | 6/1997 | Miller, Sr. et al. |
| 5,635,201 A | 6/1997 | Fabo |
| 5,715,695 A | 2/1998 | Lord |
| 5,730,120 A | 3/1998 | Yonkers, Jr. |
| 5,745,939 A | 5/1998 | Flick et al. |
| 5,749,111 A | 5/1998 | Pearce |
| 5,774,916 A | 7/1998 | Kurhi |
| 5,785,716 A | 7/1998 | Bayron et al. |
| 5,787,531 A | 8/1998 | Pepe |
| 5,787,534 A | 8/1998 | Hargest et al. |
| 5,794,289 A | 8/1998 | Wortman et al. |
| 5,800,480 A | 9/1998 | Augustine et al. |
| 5,837,002 A | 11/1998 | Augustine et al. |
| 5,875,282 A | 2/1999 | Jordan et al. |
| 5,887,304 A | 3/1999 | von der Heyde |
| 5,901,393 A | 5/1999 | Pepe et al. |
| 5,905,638 A | 5/1999 | MacDonald, Jr. et al. |
| 5,926,883 A | 7/1999 | Rechin et al. |
| 5,926,884 A | 7/1999 | Biggie et al. |
| 5,957,872 A | 9/1999 | Flick |
| 6,049,927 A | 4/2000 | Thomas et al. |
| 6,061,855 A | 5/2000 | Flick |
| 6,079,070 A | 6/2000 | Flick |
| 6,099,951 A | 8/2000 | Flick et al. |
| 6,119,474 A | 9/2000 | Augustine et al. |
| 6,131,469 A | 10/2000 | Wortman et al. |
| 6,145,142 A | 11/2000 | Rechin et al. |
| 6,152,169 A | 11/2000 | Flick |
| 6,171,333 B1 | 1/2001 | Nelson et al. |
| 6,200,284 B1 | 3/2001 | Flick |
| 6,357,491 B1 | 3/2002 | Buchanan et al. |
| 6,375,633 B1 | 4/2002 | Endress et al. |
| 6,447,865 B1 | 9/2002 | Flick et al. |
| 6,488,043 B2 | 12/2002 | Flick |

GELATINOUS COMPOSITE ARTICLE AND CONSTRUCTION

The present invention is a divisional of U.S. patent application Ser. No. 09/257,790, filed Feb. 25, 1999, now U.S. Pat. No. 6,447,865 issued Sep. 10, 2002 which is a continuation-in-part application of U.S. patent application Ser. No. 09/120,640, filed Jul. 22, 1998, now U.S. Pat. No. 6,099,951 issued Aug. 8, 2000 which are hereby incorporated by reference in their entirety.

FIELD OF THE INVENTION

The present invention joins at least two gelatinous composite articles together.

BACKGROUND OF THE INVENTION

The gelatinous elastomer material used in the present invention is fully disclosed in U.S. Pat. Nos. 4,369,284, 4,618,213, 5,262,468, 5,336,708, and 5,508,334, (the inventor in each patent is Chen) which are hereby incorporated by reference herein. These patents disclose the various embodiments of the gelatinous elastomer material. This gel material has many attributes that are sufficiently set forth in the cited patents. However, the gel material has some problems. One such problem occurs when a parallel force is applied to the gel material. The parallel force pushes the gel material so it slides and gathers as a compressed state.

In U.S. Pat. No. 5,336,708, Chen discloses a gelatinous elastomer composite article. These articles, as disclosed by Chen, "include: GMG, MGM, $MG_1G_2M$, $M_1M_2G_1G_2$, $M_2M_1G_1G_2$, $G_1MG_1G_2$, $MG_1G_2$, $G_1G_2M$, $G_2G_1M$, $GM_1M_2G$, $G_1M_1G_2M_2M_1$, $M_1GM_2GM_3GM_4$, (sic) ect, where G=gel and M=material. The subscript 1, 2, 3, and 4 are different and are represented by n which is a positive number. The material (M) suitable for forming composite articles with the gelatinous elastomer compositions can include foam, plastic fabric, metal, concrete, wood, wire screen, refractory material, glass, synthetic resin, synthetic fibers, and the like. Sandwiches of gel/material . . . are ideal for use as shock absorbers, acoustical isolators, vibration dampers, vibration isolators and wrappers. For example the vibration isolators can be (sic) use under research microscopes, office equipment, tables, and the like to remove background vibrations." U.S. Pat. No. 5,336,708, col. 3, lines 35–51. Chen further discloses, "generally the molten gelatinous elastomer composition will adhere sufficiently to certain plastics (e.g., acrylic, ethylene copolymers, nylon, polybutylene, polycarbonate, polystyrene, polyester, polyethylene, polypropylene, styrene copolymers, and the like) provided the temperature of the molten gelatinous elastomer composition is (sic) sufficient high to fuse or nearly fuse with the plastic. In order to obtain sufficient adhesion to glass, ceramics, or certain metals, sufficient temperature is also required (e.g., above 250° F. [121° C.])." U.S. Pat. No. 5,336,708, col. 9, lines 8–18 (emphasis added and brackets added for consistency of temperature comparison).

Chen provides antecedent basis for the phrase "the molten gelatinous elastomer composition" by defining it as follows: "the gelatinous elastomer composition of the present invention are prepared by blending together the components including other additives as desired at about 23° C. (73.4° F.) to about 100° C. (212° F.) forming a paste like mixture and further heating said mixture uniformly to about 150° C. (302° F.) to about 200° C. (392° F.) until a homogeneous molten blend is obtained." U.S. Pat. No. 5,336,708, col. 6, lines 52–58 (parenthesis added for consistency of temperature comparison). As such, the term "molten" has the standard definition of "1 a obs: formed in a mold: cast b: fused or liquefied by heat: melted." Webster's Third New International Dictionary of the English Language Unabridged 1456 (1966). In other words, the process to fabricate the gelatinous elastomer composite article requires the gelatinous elastomer material be in a melted state and formed upon the material (M). The resulting product, as illustrated in FIGS. 2a–2c, is the gelatinous elastomer material, G, lying on or within the material, M. In no instance does the gelatinous elastomer material of Chen penetrate through a first material, $M_1$, to contact a second material, $M_2$, underlying the first material (M). Likewise Chen fails to disclose an underlying second material, $M_2$, that penetrates through a first material, $M_1$, to contact a gelatinous elastomer material.

In some instances, two gelatinous articles must be joined together. Prior to this invention, articles, 102a and 102b, were merely attached along a respective side 104a, 104b of each article 102a, 102b. In many instances, the articles are attached with a common adhesive 106 to form an elongated article 108, as shown in FIG. 4 (prior art).

As shown in FIG. 5, when a person 110 lies on the elongated article 108, the article 108 is excessively rigid along the sides 104a, 104b. It is well known that the sides 104a, 104b are not structurally equivalent to the remainder of the article 108. As such, the elongated article 108 is uncomfortable to the person 110.

A problem to solve is to fabricate an elongated gelatinous article that provides equivalent structural properties when a person lies on the article. The present invention solves this problem.

SUMMARY OF THE INVENTION

The present invention relates to a gelatinous composite article. The article has a first and a second heat formable and heat reversible gelatinous elastomer material, a first permeable layer, and a control gap. Each of the gelatinous materials is a three-dimensional shape having an upper side, a base side and at least one connecting side. The first connecting side and the second connecting side are adjacent to each other so the first and second materials are essentially side-by-side within the same horizontal plane. The first permeable layer has a top side and a bottom side. The top side attaches to the first and second connecting sides. The control gap is interspaced between the bottom side of the first permeable layer. This gap degrades the rigidity between each connecting side and provides an equivalent structural property throughout the article.

BRIEF DESCRIPTION OF THE INVENTION

A preferred embodiment of the present invention is described in detail hereinafter with reference to the accompanying drawing, in which:

FIG. 1 is an exploded view of a gelatinous article;

FIGS. 2a–c are schematic views of the process;

Figure 8:
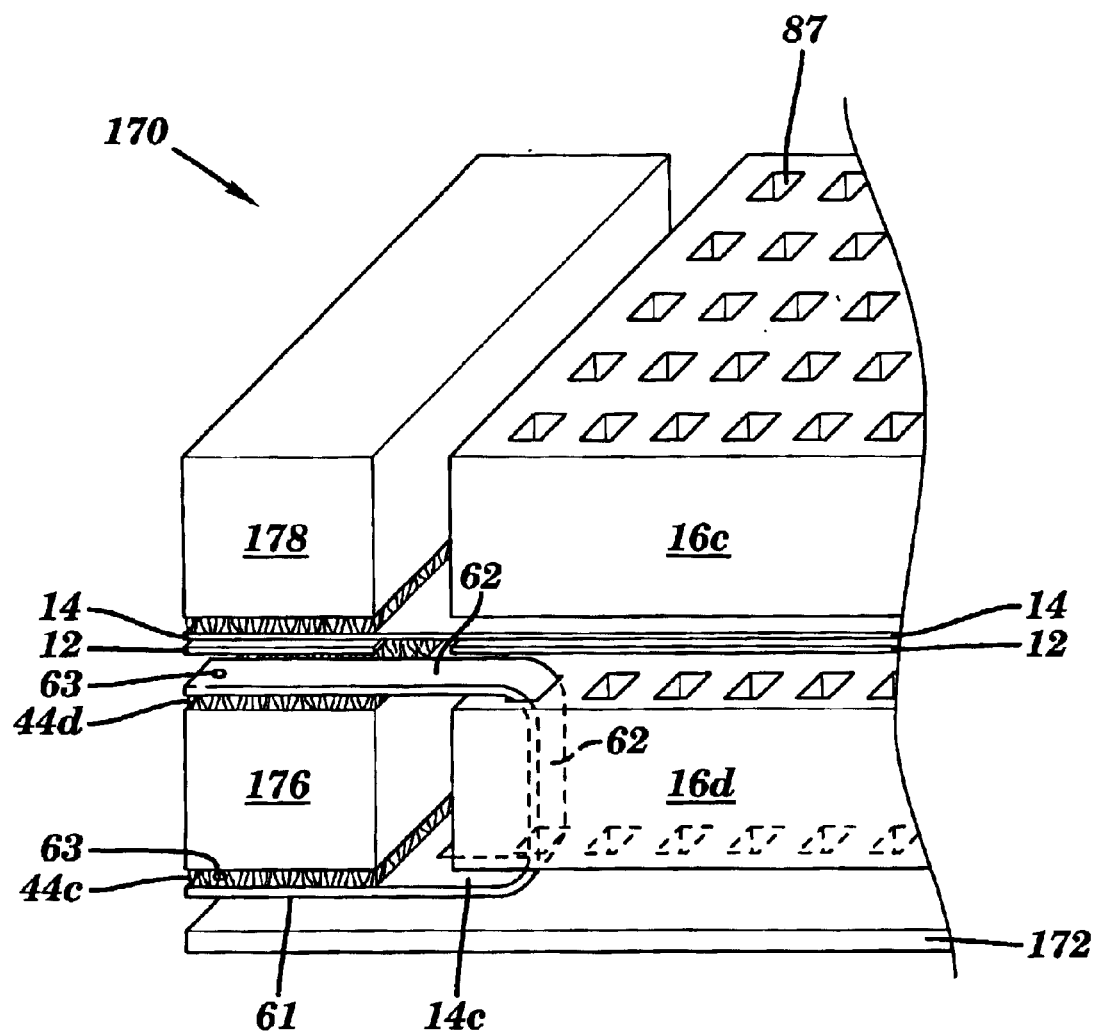
Figure 8A:
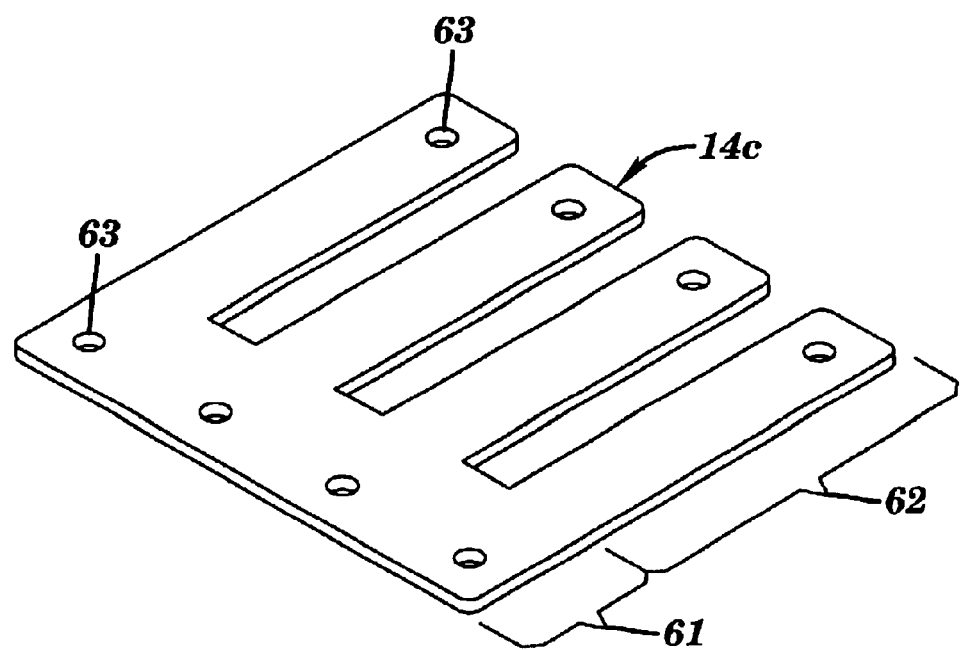
Figure 9:
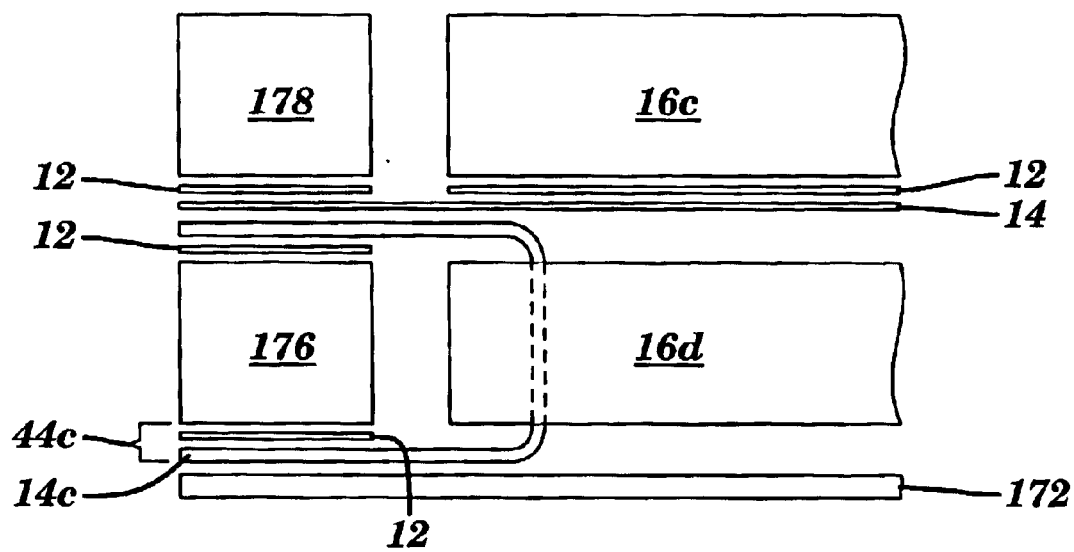
Figure 10:
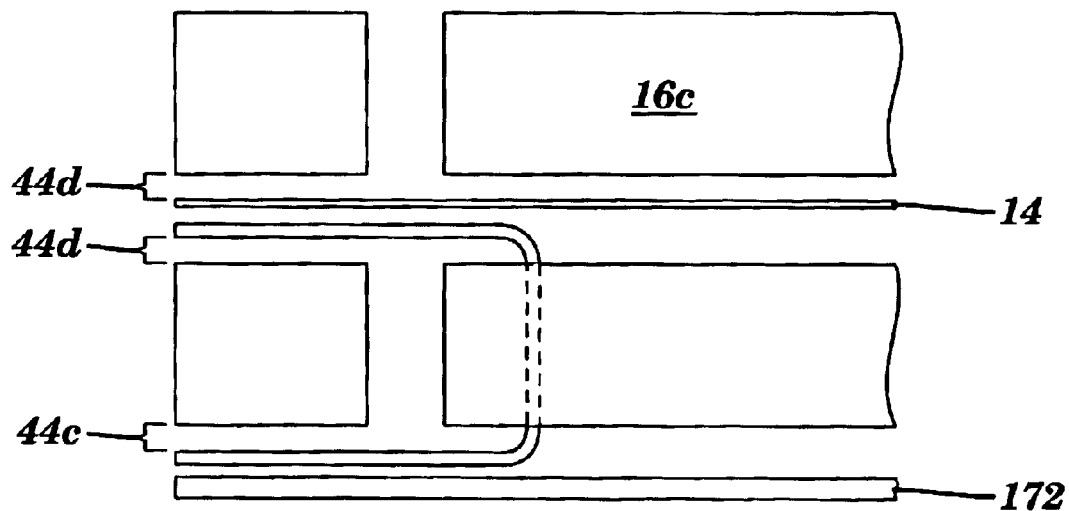

FIGS. 6a–e illustrate a method of joining two gelastic materials together;

FIGS. 7a–e illustrate an alternative embodiment of FIGS. 6a–e;

FIG. 8 shows a cross-sectional view of an alternative embodiment of the present invention;

FIG. 8a shows an enlargement and side view of element 14c of FIG. 8;

FIG. 9 shows an alternative embodiment of FIG. 8;

FIG. 10 shows another alternative embodiment of FIG. 8; and

Figure 11:
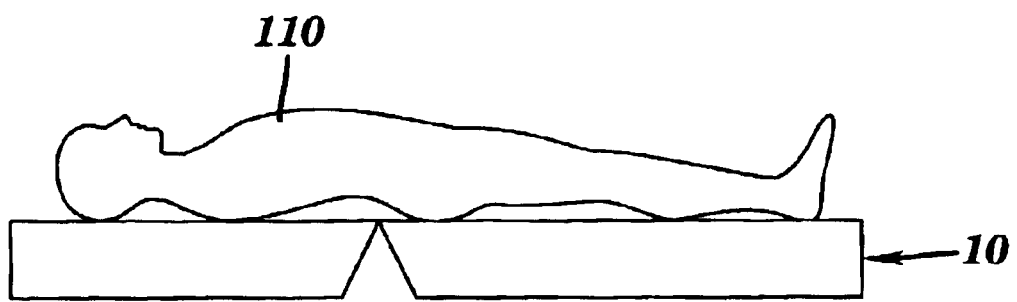

FIG. 11 shows an individual on the present invention.

DETAILED DESCRIPTION OF THE INVENTION

Figure 1:
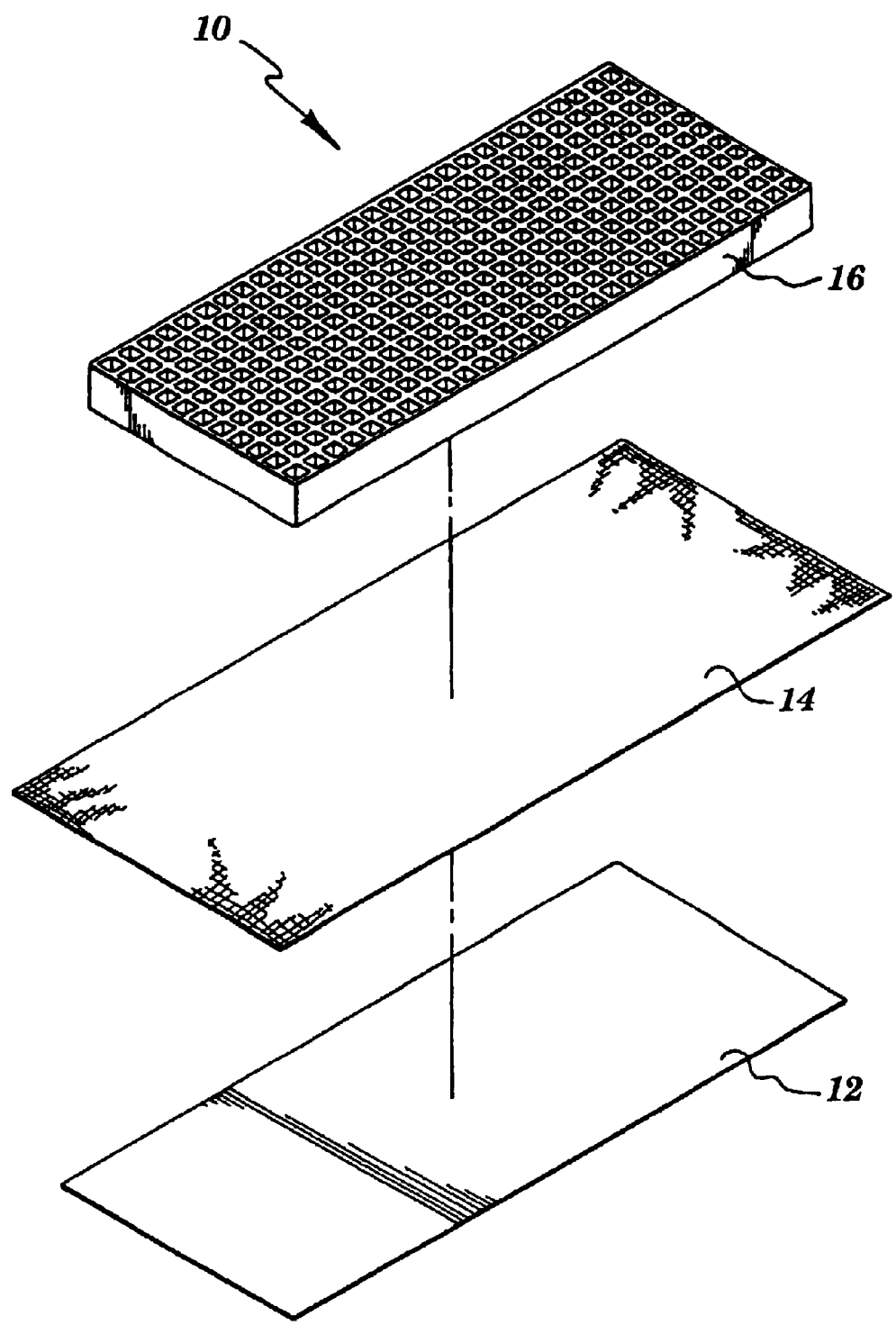

FIG. 1 illustrates a gelatinous composite article 10. Article 10 has a sealant layer 12, a permeable layer 14 and a heat formable and heat reversible gelatinous elastomer material 16. The gelatinous elastomer material 16 used in the present invention is fully disclosed in U.S. Pat. Nos. 4,369,284, 4,618,213, 5,262,468, 5,336,708, and 5,508,334, which are hereby incorporated by reference herein. The gelatinous elastomer material 16, without any material (M), is obtained from Applied Elastomerics, Incorporated of South San Francisco, Calif. Preferably, the material 16 is a lattice structure having a height ranging from about 1 cm to about 5 cm. The material 16 also has a high viscosity triblock copolymer of the general configuration poly(styrene-ethylene-butylene-styrene) and a gel rigidity of from about 20 to about 700 gram Bloom. The material 16 fuses to other surfaces at a first temperature range. The first temperature range is between 150° F. (65° C.) and 450° F. (232° C.), preferably 200° F. (93.3° C.) and 250° F. (121° C.). This material 16 by itself will go into the compressed state with any parallel force (F1).

To avoid the compressed state, the present invention uses the sealant layer 12 and permeable layer 14. The permeable layer 14 is between the sealant layer 12 and the material 16. Acceptable materials for the permeable layer 14 include polyester materials, non-woven nylon materials and any other similar materials. The permeable layer 14 provides the support to the material 16 to prevent the compressed state. Preferably, the permeable layer 14 does not actually fuse with the material 16. Rather, the permeable layer 14 melts at a second temperature. The second temperature is greater than the first temperature range so the permeable layer 14, preferably, does not fuse to the material 16. Even though the permeable layer 14, preferably, does not fuse to the material 16 the permeable layer 14 is secured to the material 14 by the underlying sealant layer 12.

The sealant layer 12 fuses to the material 16 at a temperature within the first temperature range. The sealant material 12, when melted, permeates through the permeable layer 14 to essentially secure the layer 14 to the material 16. The inventors attempted to use various sealant materials such as Superglue™ and other conventional adhesives. Those adhesives, however, did not sufficiently secure the layer 14 to the material 16. Polyolefins such as polyethylene and other similar polymeric compositions when melted are sealant layer 12 materials that secure the layer 14 to the material 16, for example, by thermo-bonding.

Figure 2A:
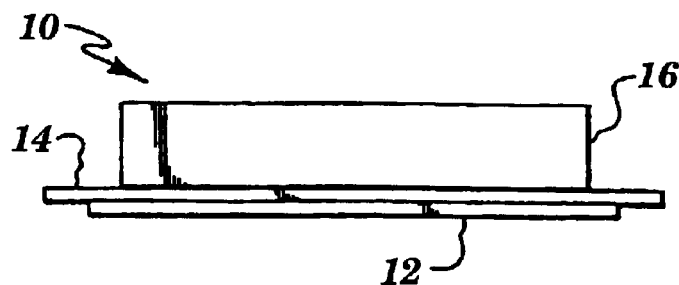
Figure 2B:
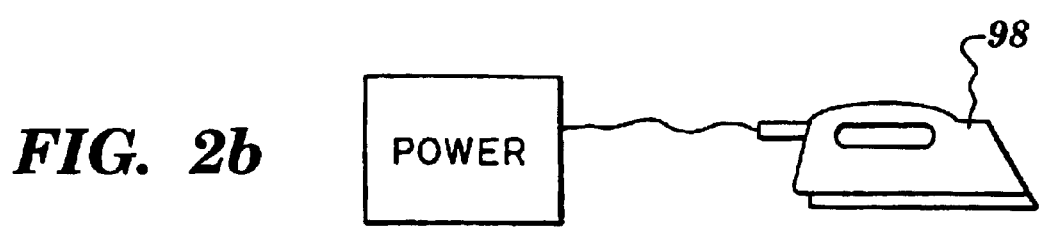
Figure 2C:
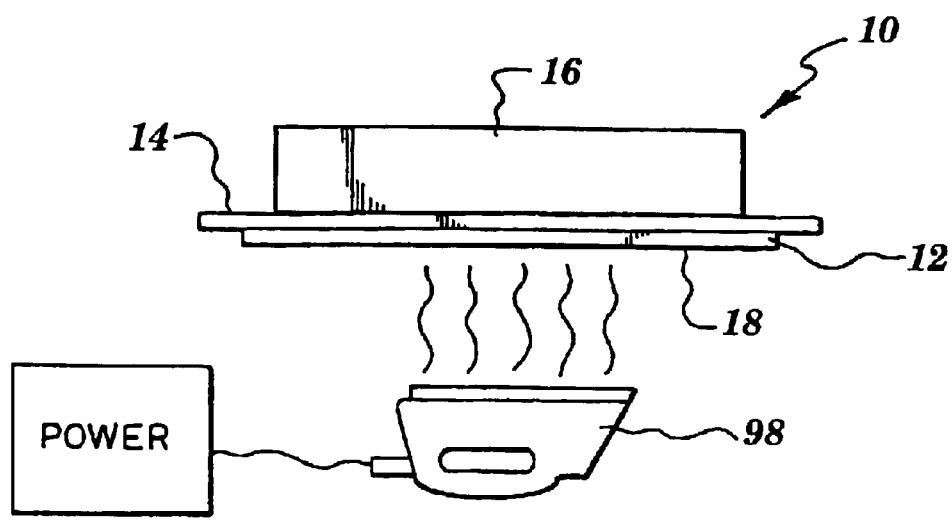

The gelatinous composite article 10 is manufactured in a three-step process as shown in FIGS. 2a–c. The first step, as shown in FIG. 2a, entails arranging the elements 12, 14, and 16 in order. This order is as follows: the gelatinous elastomer material 16 is over the permeable layer 14 which is over the sealant layer 12; preferably, the gelatinous elastomer material 16 is on the permeable layer 14 which is on the sealant layer 12. The second step requires heating a heating element 98, such as an iron, within the first temperature range as shown in FIG. 2b. The third step, illustrated in FIG. 2c, entails applying the heated heating element to the underside 18 of the article 10. The heating element transfers sufficient heat to the sealant layer 12 that the sealant layer 12 melts. The melted sealant layer 12 penetrates through the permeable layer 14 without effecting the layer 14, such as by melting layer 14, and contacts the material 16. Upon contact the melted sealant layer 12 fuses with the material 16 by melting the underside 18 of the material 16.

Figure 3:
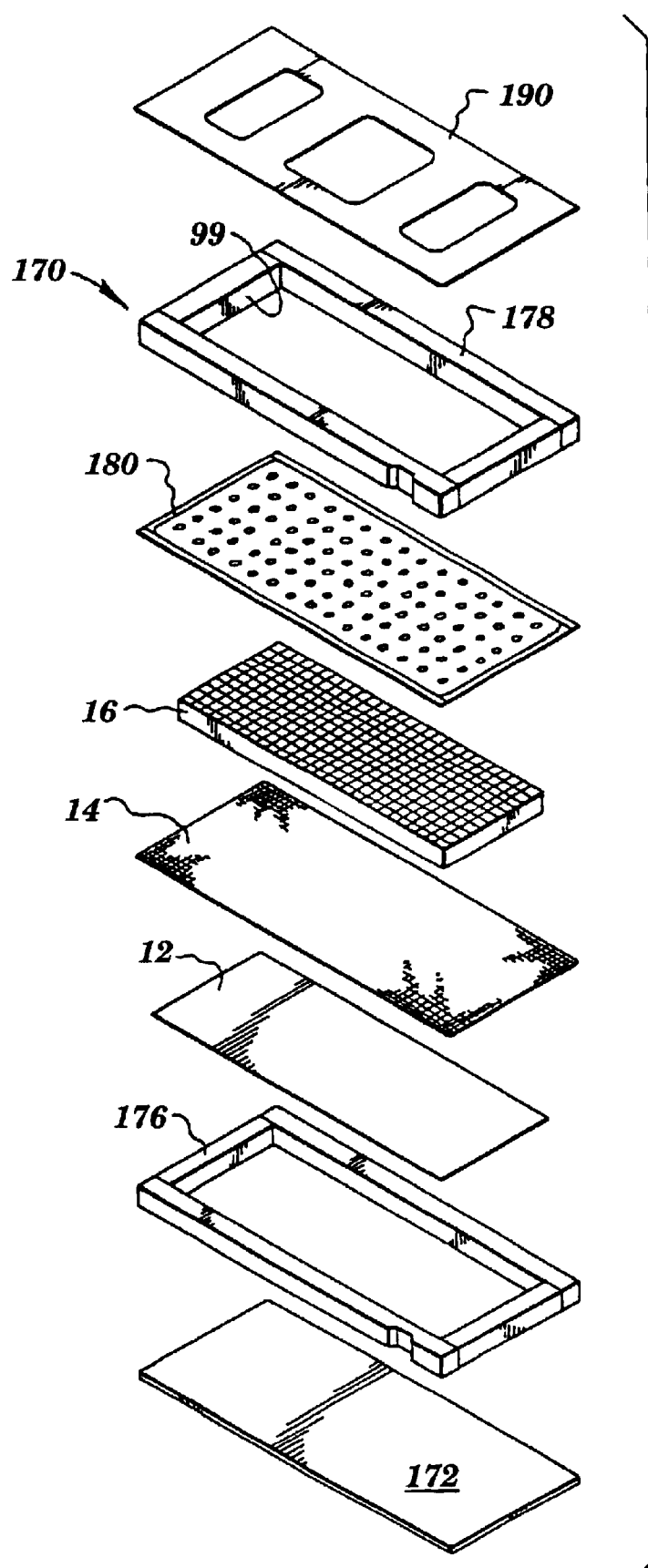
FIG. 3 is an exploded view of a gelatinous composite article in a mattress unit.
Figure 4:
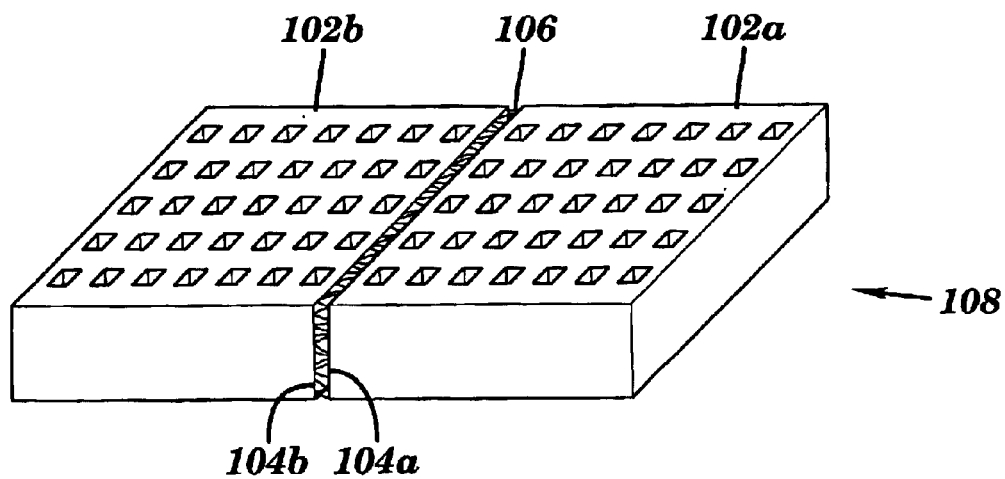
FIG. 4 is view of prior art.
Figure 5:
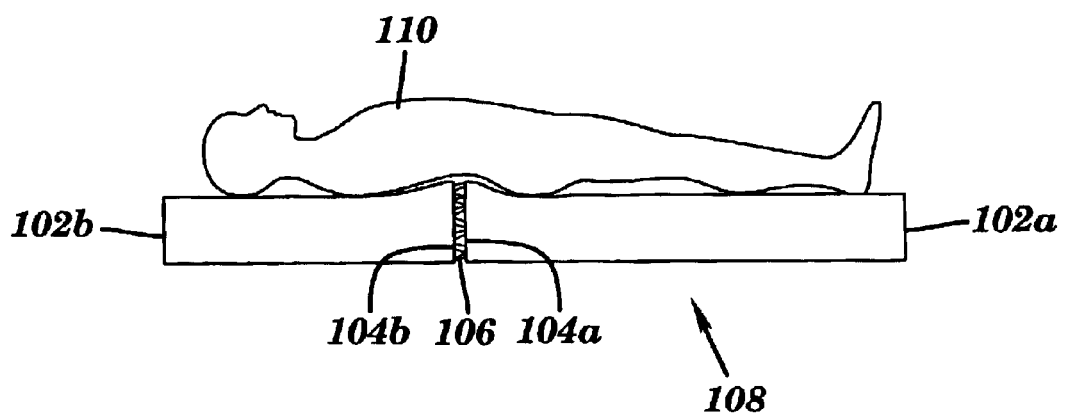
FIG. 5 is an alternate version of FIG. 4.

Turning to FIG. 3, another embodiment of the present invention is illustrated. In this embodiment, the article 10 is used in a mattress unit such as the mattress unit identified as 170. The other components 172–190, excluding 180, of the mattress unit 170 are fully disclosed in U.S. Pat. No. 5,794,289, which is hereby incorporated by reference. Two of those components are an upper crib 178 and a lower crib 176. A conventional adhesive secures the upper crib 178 and the lower crib 176 together.

The area of the permeable layer 14 is greater than the area of the gelatinous elastomer material 16. Preferably, the gelatinous elastomer material 16 has a length and width equal to or less than the area encompassed by the inner perimeter 99 of the upper crib 178 so the material 16 fits within the crib 178. In contrast, the permeable layer 14 has a length and width greater than the area encompassed by the inner perimeter 99 of the crib 178. As for the position of the material 16 in relation to the layer 14, the perimeter of the gelatinous elastomer material 16 does not contact the periphery of the permeable layer 14. The periphery of the permeable layer 14, not the material 16, is securely attached between the adhesively connected upper crib 178 and lower crib 176. As such, the cribs 178, 176 secure the article 10 into place within the mattress unit 170.

The mattress unit 170 also comprises a mattress 180. Mattress 180 is any conventional mattress such as those made with springs, air, liquid, or gel. In any case, mattress 10 fits within the crib 178 and upon article 10. Article 10 prevents mattress 180 from sliding and also prevents decubitus ulcers from forming on bed-ridden individuals.

Figure 6A:
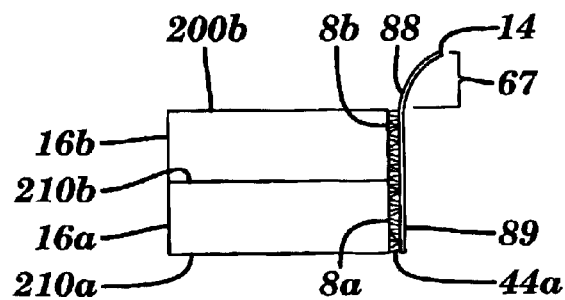

FIG. 6a shows how to join two heat-formable and heat-reversible gelatinous elastomer materials 16a, 16b together. Each gelatinous material 16a, 16b is a three-dimensional shape having an upper side 200a, 200b, a base side 210a, 210b and at least one connecting side 8a, 8b. The second material 16b is placed upon the first material 16a so the first connecting side 8a and the second connecting side 8b are in the same plane as shown.

The permeable layer 14 has a top side 88, a bottom side 89 and the top side 88 attaches to the connecting sides 8a, 8b. In this embodiment, the permeable layer 14 has a length greater than the height of the connecting sides 8a, 8b as shown in FIG. 6A. This extra material is referred to as extension 67. The attachment method is shown as item 44a and can be any type of method, such as the method illustrated in FIGS. 1–2 or by other conventional methods. Examples of these other conventional methods include, and not limited to, polyolefin films (melted), nails, velcro, magnetism, screws, adhesives like glue or other polymeric curing agents set forth, and in some cases the gelastic material 16 itself if it contains sufficient amounts of oil (melted).

Figure 6B:
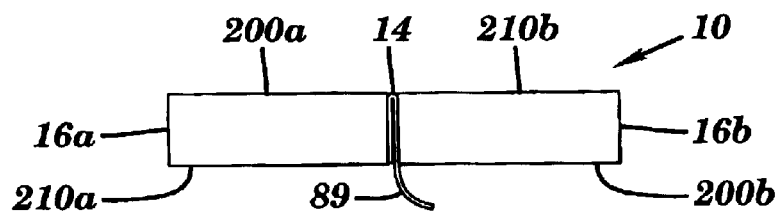

As shown in FIG. 6b, the materials 16a, 16b are repositioned so the base side 210b is in the same horizontal plane as the upper side 200a. The resulting effect is that materials 16a, 16b are in the same horizontal plane, connecting sides 8b, 8a are adjacent to each other, and the bottom side 89 of the layer 14 contacts itself.

Figure 6C:
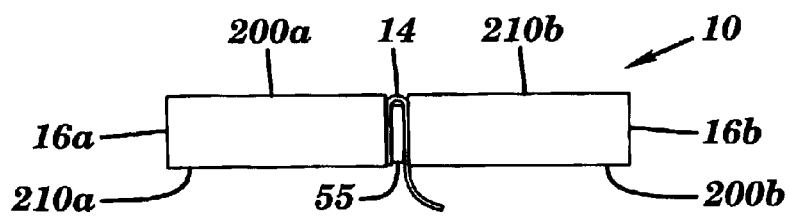

A spacer 55 is inserted between the contacting bottom side 89, as shown in FIG. 6c. The spacer 55 can be any material that fits and separates the contacting bottom side 89.

Figure 6D:
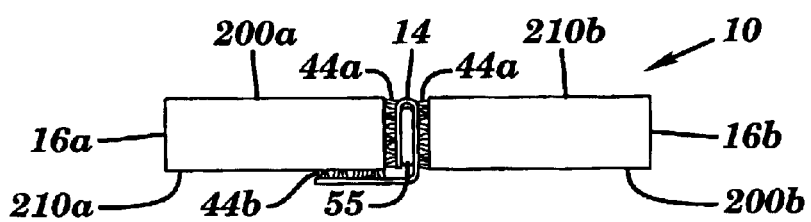

The extension 67 extends beyond the second material 16b, and as shown in FIG. 6d attaches to the base side 210a. The attachment is shown as 44b. Attachment 44b is selected from the same material as 44a, except the attachment 44b may be the same or different material than attachment 44a.

Figure 6E:
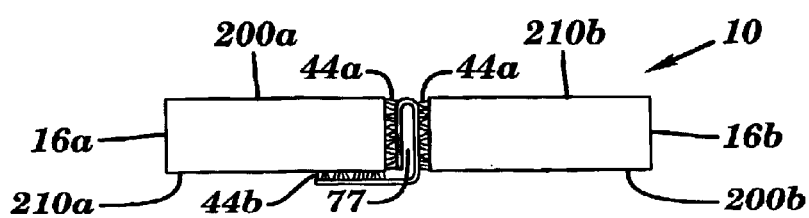

After the extension 67 is secured to base side 200b, then spacer 55 is removed to form a control gap 77. The control gap 77 degrades the rigidity between each connecting side 8a, 8b and provides an equivalent structural property throughout the article 10 when the upper side 200a contacts the base side 210b along corresponding side 8a, 8b as shown in FIG. 6e.

Obviously, the extension 67 can extend beyond the first material 16a. Thereby, the extension 67 would bind to the upper side 200a.

Figure 7A:
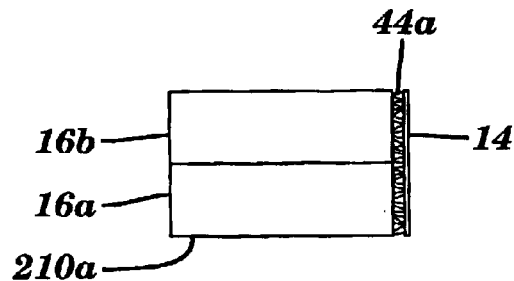
Figure 7B:
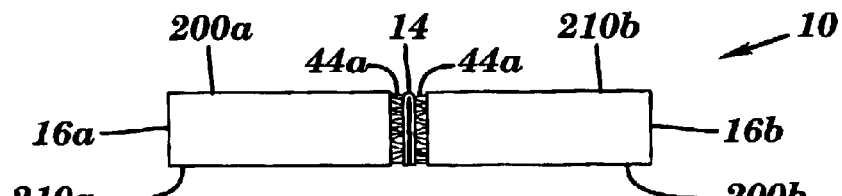
Figure 7C:
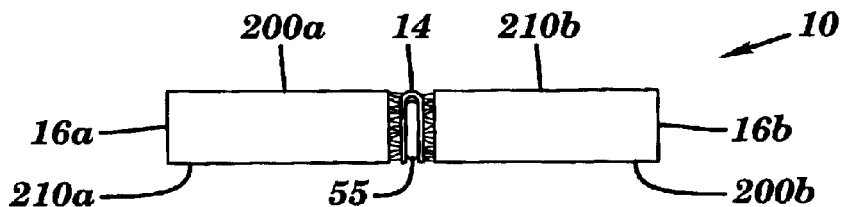
Figure 7D:
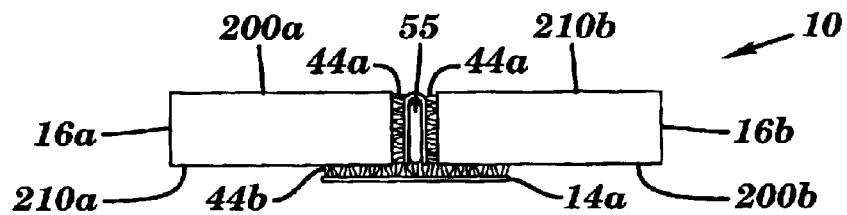
Figure 7E:
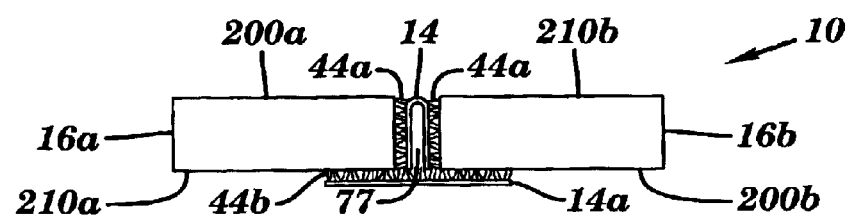

FIGS. 7a–e are extremely similar to FIGS. 6a–e, except there is no extension 67. FIGS. 7d–e use a second permeable layer 14a that connects the upper side 200b to the base side 210a. The second permeable layer 14a is selected from the same materials as permeable layer 14, except the second layer 14a may be the same or different from the layer 14.

Turning to FIG. 8, the present invention secures to the mattress crib 176, 178 by alternative embodiments. The gelastic material 16c, 16d is a triblock material with numerous apertures 87. The gelastic material 16c, 16d moves about the mattress unit 170, therefore, the material 16c, 16d must be secured.

The material 16c secures to the upper crib by the method described for FIG. 2. To secure the underlying material 16d to the lower crib 176, applicants have created an alternative permeable layer 14c. The alternative layer 14c has a palm-base 61 attached to the underside of the lower crib 176, and a set of finger-like structures 62 as shown in FIG. 8a. Returning to FIG. 8, each finger-like structure 62 extends from the bottom side of the material 16d, through a corresponding aperture 87, to the topside of the lower crib 176. The palm-base 61 attaches to the lower crib 176 by attachment 44c. Attachment 44c is selected from the same material as 44a, except the attachment 44c may be the same or different material than attachment 44a.

Likewise, each finger-like structure 62 attaches to the lower crib 176 by attachment 44d. Attachment 44d is selected from the same material as 44a, except the attachment 44d may be the same or different material than attachment 44a.

In yet another embodiment of the present invention shown in FIG. 8a, the palm-base 61 and the distal portion of the finger-like structures 62 have apertures 63 that ensure the respective attachment 44d, 44c permeates to other adjacent structures, 172,178.

Other embodiments of the present invention include those shown in FIGS. 9 and 10. FIGS. 9 and 10 show alternative embodiments of the elements 44a–d. Elements 44a–d can be a melted film 12 or a melted gelastic material 16. If the film 12 is used, as shown in FIG. 9, the film 12 is originally positioned between the permeable layer 14 and gelastic material 16. As shown in FIGS. 2a–c, the user melts the film 12 so it adheres to the material 16 and layer 14.

In some cases as shown in FIG. 10, the gelastic material 16 contains a sufficient quantity of oil wherein the film 12 is not necessary. In those cases, the user places the permeable layer 14 to the gelastic material 16, and melts the gelastic material 16. The melted gelastic material 16 adheres to the permeable layer 14.

In any of these embodiments described above, the user 110 lies upon a mattress unit 10 having equivalent structural properties as shown in FIG. 11.

Although a particular preferred embodiment of the invention has been illustrated and described in detail for illustrative purposes, it will be recognized that variations or modifications of the disclosed apparatus, including the rearrangement of parts, lie within the scope of the invention defined by the claims.

The embodiments of the invention in which an exclusive property or privilege is claimed are defined as follows:

We claim:

1. A gelatinous composite article in a mattress unit comprising:
    a foam crib in the mattress unit divided into an upper crib and a lower crib;
    a sealant layer that melts within a first temperature range;
    a first permeable layer over the sealant layer that attaches to the underside of the upper foam crib and melts at a second temperature greater than the first temperature range;
    a first heat formable and heat reversible gelatinous elastomer material over the first permeable layer that fuses to the sealant layer within the first temperature range thereby securing the permeable layer to the gelatinous layer and the first material to the upper crib;
    a second heat formable and heat reversible gelatinous elastomer material having a set of apertures within the lower crib; and
    a second permeable layer having a palm-base attached to the underside of the lower crib, and a set of finger-like structures wherein each finger-like structure secures the second material to the lower crib by having each finger inserted into a corresponding aperture to the top side of the lower crib wherein the distal part of the finger-like structure fuses between the top side of the lower crib and the sealant layer to secure the second material to the mattress unit.

2. The gelatinous composite article of claim 1 wherein the permeable layer is selected from the group consisting of polyester and non-woven nylon.

3. The gelatinous composite article of claim 1 wherein the sealant layer is selected from the group consisting of a polyolefin, adhesive, nail, velcro, magnetism, and screws.

4. The gelatinous composite article of claim 1 wherein the gelatinous elastomer material comprises a high viscosity triblock copolymer of the general configuration poly (styrene-ethylene-butylene-styrene).

5. The gelatinous composite article of claim 1 wherein the first temperature ranges between 250° and 450° F.

6. The gelatinous composite article of claim 1 wherein the area of the permeable layer is greater than the area of the gelatinous elastomer material.

7. The gelatinous composite article of claim 1 wherein the foam crib comprises the upper foam crib, the lower foam crib, and an adhesive material; the adhesive layer is between the upper and lower foam cribs, and attaches the first and second permeable layers to the foam crib.

8. The gelatinous composite article of claim 1 wherein the foam crib is along the perimeter of the heat formable and heat reversible gelatinous elastomer material.

9. The gelatinous composite article of claim 1 wherein the distal portion of each of the finger-like structures has an aperture.

10. The gelatinous composite article of claim 1 wherein the palm-base portion of the second permeable layer has apertures.

11. The gelatinous composite article of claim 1 wherein the first gelatinous elastomer material is a first section and a second section, each section has a three-dimensional shape, the shape has an upper side, a base side and at least one connecting side, the first connecting side and the second connecting side are adjacent to each other so the first and second sections are essentially side-by-side;
- a first permeable layer having a top side and a bottom side, wherein the top side attaches to the first and second connecting side; and
- a control gap interspaced between the bottom side of the first permeable layer to degrade the rigidity of between each connecting side and provide an equivalent structural property throughout the first gelatinous elastomer material.

12. The gelatinous composite article of claim 1 wherein the second gelatinous elastomer material is a first section and a second section, each section has a three-dimensional shape, the shape has an upper side, a base side and at least one connecting side, the first connecting side and the second connecting side are adjacent to each other so the first and second sections are essentially side-by-side;
- a first permeable layer having a top side and a bottom side, wherein the top side attaches to the first and second connecting side; and
- a control gap interspaced between the bottom side of the first permeable layer to degrade the rigidity of between each connecting side and provide an equivalent structural property throughout the first gelatinous elastomer material.

\* \* \* \* \*